(12) United States Patent
Zeng et al.

(10) Patent No.: US 12,366,659 B2
(45) Date of Patent: Jul. 22, 2025

(54) ULTRA-HIGH SPEED TIME-FREQUENCY FOURIER LASER VELOCIMETRY METHOD AND SYSTEM

(71) Applicants: Chongqing Institute of East China Normal University, Chongqing (CN); ROI Optoelectronics Technology CO, LTD., Shanghai (CN); East China Normal University, Shanghai (CN); XI'AN INSTITUTE OF SPACE RADIO TECHNOLOGY, Shaanxi (CN)

(72) Inventors: Heping Zeng, Chongqing (CN); Xiaoyue Wang, Chongqing (CN); Ming Yan, Chongqing (CN); Mengyun Hu, Chongqing (CN); Jinman Ge, Chongqing (CN); Xiaojun Li, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN); XI'AN INSTITUTE OF SPACE RADIO TECHNOLOGY, Shaanxi (CN)

( * ) Notice: Subject to any disclaimer, the term of this patent is extended or adjusted under 35 U.S.C. 154(b) by 918 days.

(21) Appl. No.: 17/528,930

(22) Filed: Nov. 17, 2021

(65) Prior Publication Data

US 2022/0155446 A1 May 19, 2022

(30) Foreign Application Priority Data

Nov. 17, 2020 (CN) .......................... 202011281915

(51) Int. Cl.
*G01S 17/58* (2006.01)
*G01S 7/481* (2006.01)
*H01S 3/00* (2006.01)

(52) U.S. Cl.
CPC ............ *G01S 17/58* (2013.01); *G01S 7/4814* (2013.01); *G01S 7/4816* (2013.01); *H01S 3/0057* (2013.01)

(58) Field of Classification Search
CPC ...... G01S 17/58; G01S 7/4814; G01S 7/4816; G01S 7/481; G01S 7/4818; G01S 7/483; G01J 3/18; H01S 3/0057; H04N 19/593
See application file for complete search history.

(56) References Cited

U.S. PATENT DOCUMENTS

2021/0088384 A1* 3/2021 Wang .................. H04N 19/593

FOREIGN PATENT DOCUMENTS

CN 106093962 A * 11/2016 ............. G01S 17/58

* cited by examiner

*Primary Examiner* — Yuqing Xiao
*Assistant Examiner* — Isabelle Lin Boegholm
(74) *Attorney, Agent, or Firm* — Hodgson Russ LLP

(57) ABSTRACT

A laser velocimetry method and system are provided. In the method, an ultrashort pulse laser is subjected to temporal broadening, beam splitting and spectrum broadening in sequence to from a three-dimensional measurement space. When an object moves in the measurement space, a first signal light s_1, a second signal light s_2, a third signal light s_3 are generated, based on which velocity components $v_y$, $v_x$, and $v_x$ of the target object can be obtained, respectively, so as to obtain the velocity of the object in accordance with a formula of $v=v_x \cdot i + v_y \cdot j + v_z \cdot k$.

14 Claims, 2 Drawing Sheets

ULTRA-HIGH SPEED TIME-FREQUENCY FOURIER LASER VELOCIMETRY METHOD AND SYSTEM

CROSS-REFERENCE TO RELATED APPLICATION

This application claims priority to, and the benefits of, Chinese Patent Application No. 202011281915.6, filed on Nov. 17, 2020, the entire content of which is incorporated herein by reference.

FIELD

The present disclosure relates to the field of ultrafast laser technology, and more particularly to ultrafast ultrashort pulse laser velocimetry technology.

BACKGROUND

The design and application of a velocity-measuring system has been extended to many fields: weapon research, aerospace engineering, industrial production and so on. Turbulent flow, complex flow, unsteady flow and other phenomena have always been important but difficult research objects. Therefore, the development of methods and techniques suitable for fluid motion research is always an important topic. Among them, the detection of physical states (such as velocity, acceleration, angular velocity, angular acceleration, etc.) of a high-speed moving objects is an area to be developed in the study of transient process and effect physics, and new physical effects may occur under extreme conditions, which have a direct application background in high-speed collisions, and also bring higher challenges to detection and control technology.

There are more and more methods to measure the velocity of objects. Among them, laser velocimetry stands out by virtue of its non-contact measurement, non-interference with the movement of the target object, high spatial resolution, fast response speed, high measurement accuracy and large measuring range. The development of this technology always focuses on improving the accuracy, expanding the measurement range, shortening the measurement time and the safety to human eyes.

At present, the laser velocimetry technology mainly includes Doppler velocimetry, laser curtain velocimetry, pulse laser velocimetry, and laser phase velocimetry.

The Doppler velocimetry uses Doppler effect in wave propagation to measure the velocity. When an object moves relative to the light source, lights scattered back from the object will generate a Doppler frequency shift. The magnitude of this frequency shift is related to both the velocity of the object and an angle between the incident light and the velocity direction. Although Doppler velocimetry is relatively effective in velocity measurement, the equipment for this method is huge and expensive.

In the laser curtain velocimetry, two light curtains are placed in a forward direction of a target object to be measured, and a moving velocity of the target object is measured as its average velocity when it passes through the two light curtains, which is calculated in accordance with the formula $v=S/t$, where S represents a distance between two light curtains, and t represents a time interval when the target object passes through the two light curtains. However, in this method, the processing speed and delay of one light curtain and its post-processing circuit cannot be exactly the same as that of the other one, which will cause inevitable errors, and in high accuracy measurements, these errors will bring additional negative effects on the results. In addition, lights emitted from the two light curtains shall be strictly parallel, which however is difficult to achieve in real measurement, and thus additional errors will be generated.

In the pulse laser velocimetry, the velocity measurement is realized on the basis of the distance measurement, which is calculated in accordance with a formula $S=ct/2$, where S is the distance to be measured, c is the velocity of laser in the atmosphere, and t is the round-trip propagation time of the laser on the distance to be measured. The time t is recorded and calculated by a hardware circuit part and a software processing part. The key of this method is how to accurately and stably determine the start point and end time point of the time t and accurately measure t, which involves a more complicated circuit system. In addition, the requirements for the measurement angle are very high, and the velocimetry system should directly face the moving direction of the object. Angle deviation should be less than 10 degrees to ensure the accuracy of the measurement.

The laser phase velocimetry is realized by multiple distance measurements using a phase distance-measuring method. The phase distance-measuring method is achieved by modulating the intensity of the laser. Phase modulating method includes continuous laser direct modulation, optical modulation (including acousto-optic modulation AOM and electro-optical modulation EOM), and inter-mode beat frequency modulation. Although the measurement accuracy of the laser phase velocimetry is higher than that of the pulse laser velocimetry, the laser phase velocimetry has very strict requirements on the optical path, and also requires the angle deviation to be less than 10 degrees.

In summary, the above methods all have technical deficiencies for the detection of physical states of a high-speed moving object due to the limitations of the sampling speed and the bandwidth of the electronic equipment.

SUMMARY

Embodiments of the present disclosure seek to solve at least one of the problems existing in the related art to at least some extent.

According to a first aspect of embodiments of the present disclosure, an ultra-high speed time-frequency Fourier laser velocimetry method is provided. The method includes:
 subjecting a mode-locked pulse laser emitted by a mode-locked fiber laser device to temporal broadening via a time-frequency Fourier technique;
 splitting the mode-locked pulse laser after temporal broadening into a first transmitted laser beam and a second reflected laser beam;
 subjecting the first transmitted laser beam to spectrum broadening via a first grating pair arranged vertically to obtain a first broadband spectrum, and subjecting the second reflected laser beam to spectrum broadening via a second grating pair arranged horizontally to obtain a second broadband spectrum, the first broadband spectrum being orthogonal to the second broadband spectrum so as to provide a three-dimensional measurement space for a target object coated with a reflective film;
 detecting, via a first photoelectric detector, a first signal light which comes from the first broadband spectrum and retraces in its original path after being reflected by the target object and finally is output by a first optical fiber coupler, and outputting a first high frequency electrical pulse signal from the first photoelectric detector to an oscilloscope;

detecting, via a second photoelectric detector, a second signal light which comes from the first broadband spectrum and passes through a third grating pair arranged vertically and a second optical fiber coupler, and outputting a second high frequency electrical pulse signal from the second photoelectric detector to the oscilloscope;

detecting, via a third photoelectric detector, a third signal light which comes from the second broadband spectrum and passes through a fourth grating pair arranged horizontally and a third optical fiber coupler, and outputting a third high frequency electrical pulse signal from the third photoelectric detector to the oscilloscope;

obtaining a measured period T' of a pulse sequence of the mode-locked pulse laser, and calculating a velocity component $v_y$ of the target object in a y-axis direction according to a formula of $v_y=(n(T-T')\times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere;

measuring a distance d between an intense depression of a start pulse and an intense depression of a last pulse in a pulse sequence of the second signal light, and calculating a velocity component $v_x$ of the target object in an x-axis direction in accordance with a formula of $v_x=d/((n-1)T)$;

measuring a distance d' between an intense depression of a start pulse and an intense depression of the last pulse in a pulse sequence of the third signal light, and calculating a velocity component $v_z$ of the target object in a z-axis direction in accordance with a formula of $v_z=d'/((n-1)T)$;

calculating a velocity v of the target object based on the velocity components $v_x$, $v_y$ and $v_z$ in accordance with a formula: $v=v_x\cdot i+v_y\cdot j+v_z\cdot k$, where i represents a unit vector in the x-axis direction, j represents a unit vector in the y-axis direction, and k represents a unit vector in the z-axis direction; and calculating an acceleration a, an angular velocity ω and an angular acceleration α based on the velocity v and a movement trajectory of the target object in accordance with the following formulas:

$a=\Delta v/\Delta t,$ $\omega=d\theta/dt,$ and $\alpha=\Delta\omega/\Delta t.$

According to a second aspect of embodiments of the present disclosure, an ultra-high speed time-frequency Fourier laser velocimetry system is provided. The system includes:

a mode-locked fiber laser device, configured to emit a mode-locked pulse laser;

a time-frequency Fourier system, configured to temporally broaden the mode-locked pulse laser;

a first optical fiber coupler, configured to collimate the mode-locked pulse laser coming from the time-frequency Fourier system;

a fiber circulator arranged between the time-frequency Fourier system and the first optical fiber coupler;

a beam splitter, configured to split the mode-locked pulse laser coming from the first optical fiber coupler into a first transmitted laser beam and a second reflected laser beam;

a first grating pair, arranged vertically and configured to split the first transmitted laser beam incident at a Littrow angle into a first broadband spectrum;

a second grating pair, arranged horizontally and configured to split the second reflected laser beam incident at a Littrow angle into a second broadband spectrum;

a first half-wave plate, arranged between the beam splitter and the first grating pair;

a second half-wave plate, arranged between the beam splitter and the second grating pair;

a third grating pair, arranged vertically and configured to reflect a second signal light coming from the first broadband spectrum;

a fourth grating pair, arranged horizontally and configured to reflect a third signal light coming from the second broadband spectrum;

a first photoelectric detector, configured to convert a first signal light coming from the first broadband spectrum and retracing in its original path into a first high frequency electrical pulse signal;

a second photoelectric detector, configured to convert the second signal light into a second high frequency electrical pulse signal;

a third photoelectric detector, configured to convert the third signal light into a third high frequency electrical pulse signal;

an oscilloscope, configured to receive and record the first high frequency electrical pulse signal, the second high frequency electrical pulse signal and the third high frequency electrical pulse signal;

a second optical fiber coupler, arranged between the third grating pair and the second photoelectric detector;

a third optical fiber coupler, arranged between the fourth grating pair and the third photoelectric detector;

a speculum, arranged between the third grating pair and the second optical fiber coupler, and configured to reflect the second signal light from the third grating pair; and a computing device, connected to the oscilloscope and configured to receive data from the oscilloscope, wherein the first broadband spectrum is orthogonal to the second broadband spectrum, the first grating pair and the second grating pair together provides a three-dimensional measurement space for a target object coated with a reflective film;

wherein when the target object moves within the three-dimensional measurement space, the first signal light is reflected by the target object and retraces its original path and finally output by the fiber circulator;

the oscilloscope is further configured to:

obtain a measured period T' of a pulse sequence of the mode-locked pulse laser;

measure a distance d between an intense depression of a start pulse and an intense depression of a last pulse in a pulse sequence of the second signal light;

measure a distance d' between an intense depression of a start pulse and an intense depression of a last pulse in a pulse sequence of the third signal light, and the computing device is further configured to:

calculate a velocity component $v_y$ of the target object in a y-axis direction according to a formula of $v_y=(n(T-T')\times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere;

calculate a velocity component $v_x$ of the target object in an x-axis direction in accordance with a formula of $v_x=d/((n-1)T)$;

calculate a velocity component $v_z$ of the target object in a z-axis direction in accordance with a formula of $v_z=d'/((n-1)T)$;

calculate a velocity v of the target object based on the velocity components $v_x$, $v_y$ and $v_z$ in accordance with a formula: $v=v_x \cdot i + v_y \cdot j + v_z \cdot k$, where i represents a unit vector in the x-axis direction, j represents a unit vector in the y-axis direction, and k represents a unit vector in the z-axis direction; and calculate an acceleration a, an angular velocity ω and an angular acceleration α based on the velocity v and a movement trajectory of the target object in accordance with the following formulas:

$$a = \Delta v / \Delta t,$$

$$\omega = d\theta / dt, \text{ and}$$

$$\alpha = \Delta \omega / \Delta t.$$

According to a third aspect of embodiments of the present disclosure, a non-transitory computer-readable storage medium is provided. The non-transitory computer-readable storage medium has stored therein instructions that, when executed by a processor of a mobile terminal, cause the ultra-high speed time-frequency Fourier laser velocimetry method as described above to be performed.

It should be appreciated that, the general description hereinbefore and the detail description hereinafter are explanatory and illustrative, and shall not be construed to limit the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
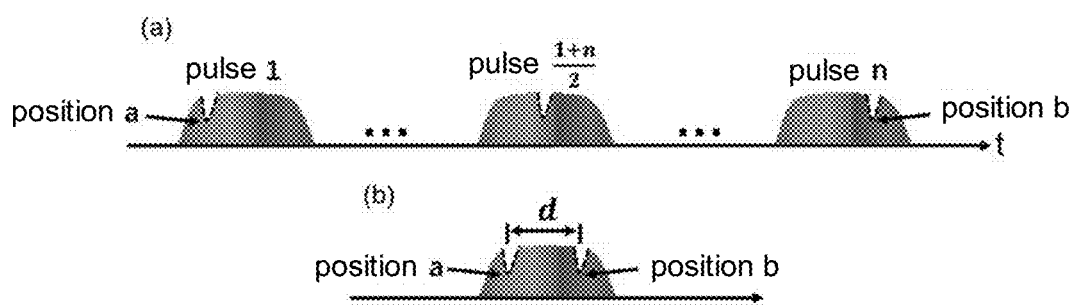
FIG. 1 is a schematic diagram illustrating a principle for measuring a velocity component $v_x$ or a velocity component $v_z$ of the target object using an ultra-high speed time-frequency Fourier laser velocimetry method according to embodiments of the present disclosure.
Figure 2:
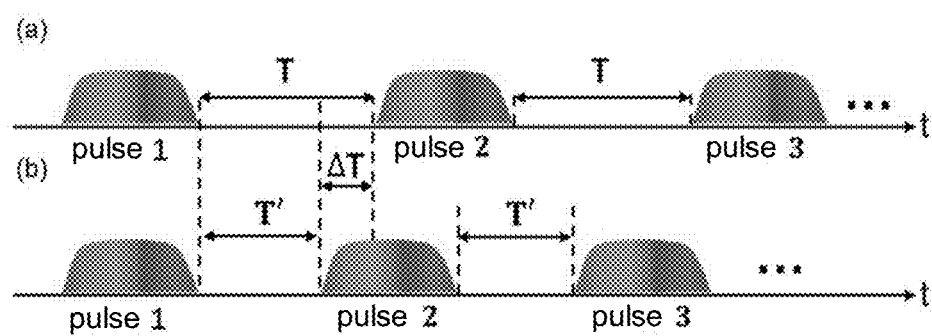
FIG. 2 is a schematic diagram illustrating a principle for measuring a velocity component $v_y$ of the target object using an ultra-high speed time-frequency Fourier laser velocimetry method according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Embodiments of the present disclosure seek to provide an ultra-high speed time-frequency Fourier laser velocimetry method and system, which has excellent time resolution and spatial resolution, and may be fully applied in the field of three-dimensional velocity measurement. In addition, the above method and system have a large dynamic range and a fast response speed, can realize full-field and transient measurement of a high-speed moving object, and visualize the speed measurement.

In a first aspect, embodiments of the present disclosure provide an ultra-high speed time-frequency Fourier laser velocimetry method. The method includes:

subjecting a mode-locked pulse laser emitted by a mode-locked fiber laser device to temporal broadening via a time-frequency Fourier technique;

splitting the mode-locked pulse laser after temporal broadening into a first transmitted laser beam and a second reflected laser beam;

subjecting the first transmitted laser beam to spectrum broadening via a first grating pair arranged vertically to obtain a first broadband spectrum, and subjecting the second reflected laser beam to spectrum broadening via a second grating pair arranged horizontally to obtain a second broadband spectrum, the first broadband spectrum being orthogonal to the second broadband spectrum so as to provide a three-dimensional measurement space for a target object coated with a reflective film;

detecting, via a first photoelectric detector, a first signal light which comes from the first broadband spectrum and retraces in its original path after being reflected by the target object and finally is output by a first optical fiber coupler, and outputting a first high frequency electrical pulse signal from the first photoelectric detector to an oscilloscope;

detecting, via a second photoelectric detector, a second signal light which comes from the first broadband spectrum and passes through a third grating pair arranged vertically and a second optical fiber coupler, and outputting a second high frequency electrical pulse signal from the second photoelectric detector to the oscilloscope;

detecting, via a third photoelectric detector, a third signal light which comes from the second broadband spectrum and passes through a fourth grating pair arranged horizontally and a third optical fiber coupler, and outputting a third high frequency electrical pulse signal from the third photoelectric detector to the oscilloscope;

obtaining a measured period T' of a pulse sequence of the mode-locked pulse laser, and calculating a velocity component $v_y$ of the target object in a y-axis direction according to a formula of $v_y=(n(T-T') \times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere;

measuring a distance d between an intense depression of a start pulse and an intense depression of a last pulse in a pulse sequence of the second signal light, and calculating a velocity component $v_x$ of the target object in an x-axis direction in accordance with a formula of $v_x=d/((n-1)T)$;

measuring a distance d' between an intense depression of a start pulse and an intense depression of a last pulse in a pulse sequence of the third signal light, and calculating a velocity component $v_z$ of the target object in a z-axis direction in accordance with a formula of $v_z=d'/((n-1)T)$;

calculating a velocity v of the target object based on the velocity components $v_x$, $v_y$, and $v_z$ in accordance with a formula: $v=v_x \cdot i+v_y \cdot j+v_z \cdot k$, where i represents a unit vector in the x-axis direction, j represents a unit vector in the y-axis direction, and k represents a unit vector in the z-axis direction; and calculating an acceleration a, an angular velocity ω and an angular acceleration α based on the velocity v and a movement trajectory of the target object in accordance with the following formulas:

$a=\Delta v/\Delta t$, $\omega=d\theta/dt$, and $\alpha=\Delta\omega/\Delta t$.

In an embodiment of the present disclosure, the mode-locked pulse laser is an ultrashort monopulse laser.

In an embodiment of the present disclosure, wherein subjecting a mode-locked pulse laser to temporal broadening via a time-frequency Fourier technique includes:

expanding the mode-locked pulse laser using a group delay dispersion element;

mapping a temporal spectrum of a laser pulse to a time waveform with an intensity envelope similar to the temporal spectrum through dispersive Fourier transform;

converting an optical signal into an analog electrical signal waveform through photoelectric detection, followed by performing digitization through real-time analog-to-digital conversion;

performing digital signal processing and data analysis, such that the mode-locked monopulse laser spectrum of the mode-locked fiber laser device is mapped to a time waveform directly displayed on the oscilloscope.

In an embodiment of the present disclosure, each of the first grating pair, the second grating pair, the third grating pair and the fourth grating pair has a working wavelength of 1550 nm, a blazing angle of 28.41°, a line density of 600 lines/mm, and a diffraction efficiency of greater than 70%.

In an embodiment of the present disclosure, the first transmitted laser beam enters the first grating pair at a Littrow angle, such that the first transmitted laser beam is split into the first broadband spectrum under diffraction effect of the first grating pair. The second reflected laser beam enters the second grating pair at a Littrow angle, such that the second reflected laser beam is split into the second broadband spectrum under diffraction effect of the second grating pair.

Because lights of different frequencies in a laser beam have different diffraction angles, the laser beam will be split into a continuous spectral by one grating of a grating pair under the diffraction effect of the grating, and the continuous spectra will form a broadband spectrum with uniform laser frequency distribution after reflected by the other grating of the grating pair. Therefore, the first transmitted laser beam will form the first broadband spectrum after passing through the first grating pair, and the second reflected laser beam will form the second broadband spectrum after passing through the second grating pair.

In an embodiment of the present disclosure, the target object has such a size that is detectable by the method, that is, the size of the target object depends on the three-dimensional measurement space defined by the first broadband spectrum and the second broadband spectrum.

In an embodiment of the present disclosure, each of the first broadband spectrum and the second broadband spectrum has a width of 1 cm and a height of 0.2 cm after propagating 5 cm, and the three-dimensional measurement space has a size of 1 cm×1 cm×0.2 cm.

In an embodiment of the present disclosure, the target object has such a moving velocity that is detectable by the method, that is, the moving velocity of the target object detectable by the method is determined by the repetition period of the mode-locked pulse laser device and a spectral space width (i.e., a width of continuous spectral lines) of each of the first broadband spectrum and the second broadband spectrum.

In an embodiment of the present disclosure, the repetition period of the mode-locked pulse laser device is 50 MHz (corresponding to 20 ns), and the spectral space width of each of the first broadband spectrum and the second broadband spectrum is 1 cm, and the velocity of the target object detectable by the method is 500 km/s.

It should be illustrated that, when the target object moves within the three-dimensional measurement space, a part of a broadband spectrum will be blocked by the target object, such that an intense depression appears on the corresponding light signal. Because the target object moves fast, depression in signal strength between adjacent light pulses is weaker during the movement, while intense depression happens to a start pulse (i.e., the first pulse) and an end pulse (i.e., the last pulse), and a distance between the intense depression of the start pulse and the intense depression of the last pulse in a pulse sequence can be measured.

Specifically, in embodiments of the present disclosure, when the target object moves within the three-dimensional measurement space, a part of the first broadband spectrum will be blocked by the target object, so that the second signal light coming from the first broadband spectrum will have intense depressions at its start pulse and last pulse, and the distance d between the intense depressions of the start pulse and the last pulse of the second signal light can be measured, and based on the distance d, the velocity component $v_x$ of the target object in the x-axis direction can be calculated in accordance with the formula of $v_x=d/((n-1)T)$.

Similarly, the third signal light coming from the second broadband spectrum will have intense depressions at its start pulse and last pulse, the distance d' between the intense depressions of the start pulse and the last pulse of the third signal light can be measured, and based on the distance d', the velocity component $v_z$ of the target object in the z-axis direction can be calculated in accordance with the formula of $v_z=d'/((n-1)T)$.

In an embodiment, the unit time is one second, and n light pulses are emitted by the mode-locked pulse laser per second, and a movement time of the target object is nT, where T is the repetition period of the pulse sequence emitted by the mode-locked pulse laser.

Time between the first pulse and the last pulse is nT, while actual measured time is nT' due to the movement of the target object, so a delay after n light pulses is n(T−T'), and a corresponding movement distance of the target object is n(T−T')×c. Therefore, the velocity component $v_y$ of the target object in the y-axis direction is $v_y=(n(T-T')\times c)/nT$.

In a second aspect, embodiments of the present disclosure provide an ultra-high speed time-frequency Fourier laser velocimetry system. The system includes:
- a mode-locked fiber laser device, configured to emit a mode-locked pulse laser;
- a time-frequency Fourier system, configured to temporally broaden the mode-locked pulse laser;
- a first optical fiber coupler, configured to collimate the mode-locked pulse laser coming from the time-frequency Fourier system;
- a fiber circulator arranged between the time-frequency Fourier system and the first optical fiber coupler;
- a beam splitter, configured to split the mode-locked pulse laser coming from the first optical fiber coupler into a first transmitted laser beam and a second reflected laser beam;
- a first grating pair, arranged vertically and configured to split the first transmitted laser beam incident at a Littrow angle into a first broadband spectrum;
- a second grating pair, arranged horizontally and configured to split the second reflected laser beam incident at a Littrow angle into a second broadband spectrum;
- a first half-wave plate, arranged between the beam splitter and the first grating pair;
- a second half-wave plate, arranged between the beam splitter and the second grating pair;
- a third grating pair, arranged vertically and configured to reflect a second signal light coming from the first broadband spectrum;
- a fourth grating pair, arranged horizontally and configured to reflect a third signal light coming from the second broadband spectrum;
- a first photoelectric detector, configured to convert a first signal light coming from the first broadband spectrum and retracing in its original path into a first high frequency electrical pulse signal;
- a second photoelectric detector, configured to convert the second signal light into a second high frequency electrical pulse signal;
- a third photoelectric detector, configured to convert the third signal light into a third high frequency electrical pulse signal;
- an oscilloscope, configured to receive and record the first high frequency electrical pulse signal, the second high frequency electrical pulse signal and the third high frequency electrical pulse signal;
- a second optical fiber coupler, arranged between the third grating pair and the second photoelectric detector;
- a third optical fiber coupler, arranged between the fourth grating pair and the third photoelectric detector;
- a speculum, arranged between the third grating pair and the second optical fiber coupler, and configured to reflect the second signal light from the third grating pair; and
- a computing device, connected to the oscilloscope and configured to receive data from the oscilloscope,
wherein the first broadband spectrum is orthogonal to the second broadband spectrum, the first grating pair and the second grating pair together provides a three-dimensional measurement space for a target object coated with a reflective film;
wherein when the target object moves within the three-dimensional measurement space, the first signal light is reflected by the target object and retraces its original path and finally output by the fiber circulator;

the oscilloscope is further configured to:
obtain a measured period T' of a pulse sequence of the mode-locked pulse laser;
measure a distance d between an intense depression of a start pulse and an intense depression of a last pulse in a pulse sequence of the second signal light;
measure a distance d' between an intense depression of a start pulse and an intense depression of a last pulse in a pulse sequence of the third signal light, and the computing device is further configured to:
calculate a velocity component $v_y$ of the target object in a y-axis direction according to a formula of $v_y=(n(T-T')\times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere;
calculate a velocity component $v_x$ of the target object in an x-axis direction in accordance with a formula of $v_x=d/((n-1)T)$;
calculate a velocity component $v_z$ of the target object in a z-axis direction in accordance with a formula of $v_z=d'/((n-1)T)$;
calculate a velocity v of the target object based on the velocity components $v_x$, $v_y$ and $v_z$ in accordance with a formula: $v=v_x\cdot i+v_y\cdot j+v_z\cdot k$, where i represents a unit vector in the x-axis direction, j represents a unit vector in the y-axis direction, and k represents a unit vector in the z-axis direction; and
calculate an acceleration a, an angular velocity ω and an angular acceleration α based on the velocity v and a movement trajectory of the target object in accordance with the following formulas:

$$a=\Delta v/\Delta t,$$

$$\omega=d\theta/dt, \text{ and}$$

$$\alpha=\Delta\omega/\Delta t.$$

In an embodiment of the present disclosure, each of the first grating pair, the second grating pair, the third grating pair and the fourth grating pair has a working wavelength of 1550 nm, a blazing angle of 28.41°, a line density of 600 lines/mm, and a diffraction efficiency of greater than 70%.

In an embodiment of the present disclosure, a size of the target object detectable by the system depends on the three-dimensional measurement space defined by the first broadband spectrum and the second broadband spectrum.

In an embodiment of the present disclosure, each of the first broadband spectrum and the second broadband spectrum has a width of 1 cm and a height of 0.2 cm after propagating 5 cm, such that the three-dimensional measurement space has a size of 1 cm×1 cm×0.2 cm.

In an embodiment of the present disclosure, the velocity of the target object detectable by the system is determined by the repetition period of the mode-locked pulse laser and a width of each of the first broadband spectrum and the second broadband spectrum.

In an embodiment of the present disclosure, the repetition period of the mode-locked pulse laser is 50 MHz, and the width of each of the first broadband spectrum and the second broadband spectrum is 1 cm, such that the velocity of the target object detectable by the method is 500 km/s.

In a third aspect, embodiments of the present disclosure provide a non-transitory computer-readable storage medium. The non-transitory computer-readable storage medium has stored therein instructions that, when executed by a processor of a mobile terminal, cause the ultra-high speed time-frequency Fourier laser velocimetry method as described hereinbefore to be performed.

It should be illustrated that, the contents described above in embodiments with respect to the ultra-high speed time-frequency Fourier laser velocimetry method are also applicable to the ultra-high speed time-frequency Fourier laser velocimetry system and the non-transitory computer-readable storage medium, which will not be elaborated herein.

The advantages of embodiments of the present disclosure lie in that real-time, continuous single-frame light pulse time-domain transient information can be obtained by the method and system of the present disclosure without complex optical and circuit structures, the update rate of the velocity measurement data is not limited by the moving direction of the object, and the pulses can be measured one by one so as to obtain the moving velocity of the high-speed object. Therefore, the ultra-high speed time-frequency Fourier laser velocimetry method and system provided in the present disclosure overcome the limitation of sampling speed and bandwidth of the electronic equipment, and realize continuous, ultrafast, frame-by-frame collection of the optical signals, which provide a new technical way of high speed and high time resolution for the basic research of real-time high-speed velocimetry and the development of new technology.

In the following, the ultra-high speed time-frequency Fourier laser velocimetry method and system according to embodiments of the present disclosure will be described in detail with reference to the drawings.

As illustrated in FIG. 1 to FIG. 4, the principle of the ultra-high speed time-frequency Fourier laser velocimetry method is as follows. First, an ultrashort pulse laser is subjected to temporal broadening via a time-frequency Fourier technique. Then, the ultrashort pulse laser is split into a first transmitted laser beam and a second reflected laser beam. The first transmitted laser beam is subjected to spectrum broadening via a first grating pair arranged vertically to obtain a first broadband spectrum, and the second reflected laser beam is subjected to spectrum broadening via a second grating pair arranged horizontally to obtain a second broadband spectrum. The first broadband spectrum is orthogonal to the second broadband spectrum so as to provide a three-dimensional measurement space for a target object coated with a reflective film. When the target object moves at a certain velocity in the three-dimensional measurement space, a first signal light s_1 coming from the first broadband spectrum and reflected by the target object will retrace in its original path to the first grating pair, and finally output by the fiber circulator and detected by a first fast responsive photoelectric detector; a second signal light s_2 coming from the first broadband spectrum passes through a third grating pair, a speculum and a second optical fiber coupler in sequence and finally detected by a second fast responsive photoelectric detector; and a third signal light s_3 coming from the second broadband spectrum passes through a fourth grating pair and a third optical fiber coupler, and finally detected by a third fast responsive photoelectric detector. The first signal light s_1, the second signal light s_2 and the third signal light s_3 are converted by the respective photoelectric detectors into a first high frequency electrical pulse signal, a second high frequency electrical pulse signal and a third high frequency electrical pulse signal, respectively, which are then transmitted to and recorded by an oscilloscope. By calculating optical pulse delay of the pulse sequence of the first signal light s_1 in unit time, a velocity component $v_y$ of the target object in a y-axis direction can be obtained. By measuring a distance d between an intense depression of a start pulse and an intense depression of an end pulse in the pulse sequence of the second signal light s_2, a velocity component $v_x$ of the target object in an x-axis direction can be obtained. By measuring a distance d' between an intense depression of a start pulse and an intense depression of an end pulse in the pulse sequence of the third signal light s_3, a velocity component $v_z$ of the target object in a z-axis direction can be obtained. Then, a velocity of the target object can be obtained in accordance with a formula of $v=v_x \cdot i + v_y \cdot j + v_z \cdot k$. Based on the velocity v and a movement trajectory of the target object, an acceleration a, an angular velocity ω and an angular acceleration α can be calculated in accordance with the following formulas:

$$a=\Delta v/\Delta t,$$

$$\omega=d\theta/dt, \text{ and}$$

$$\alpha=\Delta\omega/\Delta t.$$

Figure 3:
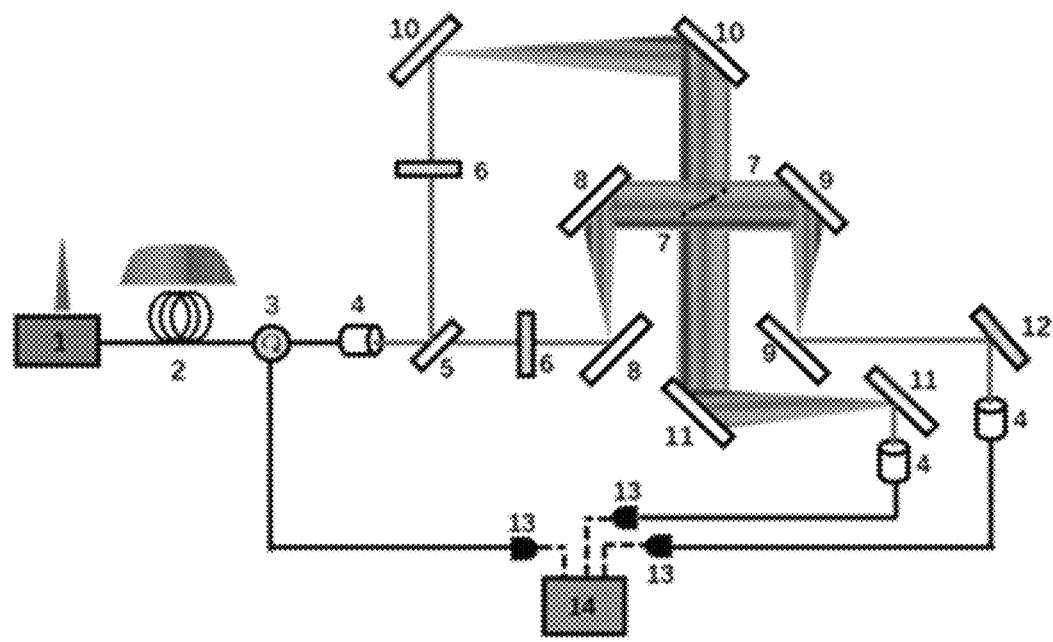
FIG. 3 is a schematic diagram of an ultra-high speed time-frequency Fourier laser velocimetry system according to embodiments of the present disclosure.
Figure 4:
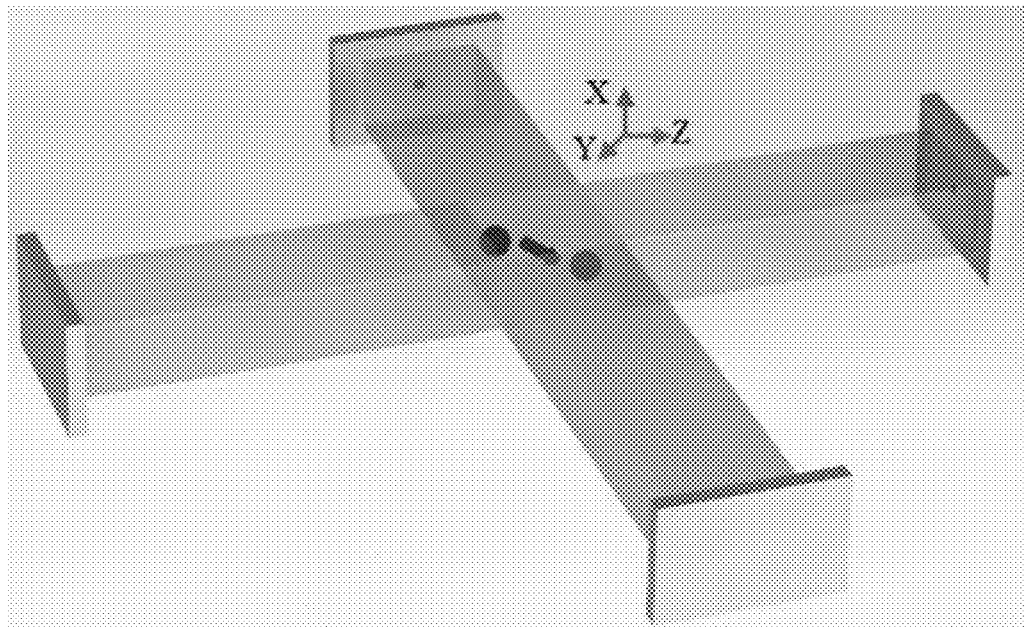
FIG. 4 is a schematic diagram illustrating movement of a target object in a three-dimensional spectrum according to embodiments of the present disclosure.

As illustrated in FIG. 3, the system includes a mode-locked fiber laser device 1, a time-frequency Fourier system 2, a fiber circulator 3, three optical fiber couplers 4 (i.e., a first optical fiber coupler, a second optical fiber coupler and a third optical fiber coupler), a beam splitter 5, two half-wave plates 6 (i.e., a first half-wave plate and a second half-wave plate), four grating pairs (i.e., a first grating pair 8, a third grating pair 9, a second grating pair 10 and a fourth grating pair 11), a speculum 12, three photoelectric detectors 13 (i.e., a first photoelectric detector, a second photoelectric detector and a third photoelectric detector), and an oscilloscope 14; and a computing device connected to the oscilloscope 14 (not shown). The first grating pair 8 and the third grating pair 9 are arranged vertically, and the second grating pair 10 and the fourth grating pair 11 are arranged horizontally.

The mode-locked pulse laser emitted by the mode-locked fiber laser device 1 passes through the time-frequency Fourier system 2 (i.e., a monomode fiber system) having a length of 500 m, the fiber circulator 3 and the first optical fiber coupler 4 in sequence to output a collimated laser beam, which is split by the beam splitter 5 into a first transmitted laser beam and a second reflected laser beam. The first transmitted laser beam and the second reflected laser beam each passes through the respective half-wave plates 6 to adjust their polarization state, so as to reach an optimum diffraction efficiency.

Afterwards, the first transmitted laser beam enters the first grating pair 8 at a Littrow angle, and the second reflected laser beam enters the second grating pair 10 at a Littrow angle. Because lights of different frequencies in a laser beam has different diffraction angles, the laser beam will be split into a continuous spectral by one grating of a grating pair under the diffraction effect of the grating, and the continuous spectra will form a broadband spectrum with uniform laser frequency distribution after reflected by the other grating of the grating pair. Therefore, the first transmitted laser beam will form a first broadband spectrum after passing through the first grating pair 8, and the second reflected laser beam will form a second broadband spectrum after passing through the second grating pair 10. The first broadband spectrum is orthogonal to the second broadband spectrum so as to provide a three-dimensional measurement space for a target object coated with a reflective film.

When the target object moves at a certain velocity within the three-dimensional measurement space, a first signal light s_1 coming from the first broadband spectrum and reflected by the target object will retrace in its original path to the first grating pair 8, and finally output by the fiber circulator 3 and detected by a first photoelectric detector 13.

When the target object moves within the three-dimensional measurement space, a part of the first broadband spectrum and a part of the second broadband spectrum will be blocked by the target object, so that a second signal light s_2 coming from the first broadband spectrum and a third signal light s_3 coming from the second broadband spectrum each will have an intense depression at their respective positions. The second signal light s_2 passes through the third grating pair 9, the speculum 12 and the second optical fiber coupler 4 in sequence and finally detected by the second photoelectric detector 13. The third signal light s_3 passes through the fourth grating pair 11 and the third optical fiber coupler 4, and finally detected by the third photoelectric detector 13.

The first signal light s_1, the second signal light s_2 and the third signal light s_3 are converted by the respective photoelectric detectors into a first high frequency electrical pulse signal, a second high frequency electrical pulse signal and a third high frequency electrical pulse signal, respectively, which are then transmitted to and recorded by the oscilloscope 14.

In an embodiment, the three photoelectric detectors each have a responsive bandwidth of 40 GHz, the oscilloscope has a bandwidth of 33 GHz, and the sampling frequency is 80 GS/s.

A distance d between an intense depression of a start pulse and an intense depression of an end pulse in the pulse sequence of the second signal light s_2 is measured according to the second high frequency electrical pulse signal, and then a velocity component $v_x$ of the target object in an x-axis direction is calculated in accordance with a formula of $v_x=d/((n-1)T)$, where n is the number of pulses emitted in unit time, T is a repetition period of the mode-locked pulse laser.

Similarly, a distance d' between an intense depression of a start pulse and an intense depression of an end pulse in the pulse sequence of the third signal light s_3 is measured according to the third high frequency electrical pulse signal, and then a velocity component $v_z$ of the target object in a z-axis direction is calculated in accordance with a formula of $v_z=d'/((n-1)T)$, where n is the number of pulses emitted in unit time, T is a repetition period of the mode-locked pulse laser.

According to the first high frequency electrical pulse signal, a measured period T' of a pulse sequence of the mode-locked pulse laser is obtained, and then a velocity component $v_y$ of the target object in a y-axis direction is calculated in accordance with a formula of $v_y=(n(T-T')\times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere.

Therefore, the moving velocity of the target object can be calculated in accordance with a formula of $v=v_x \cdot i+v_y \cdot j+v_z \cdot k$, where i represents a unit vector in the x-axis direction, j represents a unit vector in the y-axis direction, and k represents a unit vector in the z-axis direction.

Based on the velocity v and a movement trajectory of the target object, an acceleration a, an angular velocity ω and an angular acceleration α can be calculated in accordance with the following formulas:

$a=\Delta v/\Delta t$, $\omega=d\theta/dt$, and $\alpha=\Delta\omega/\Delta t$.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An ultra-high speed time-frequency Fourier laser velocimetry method, comprising:
    subjecting a mode-locked pulse laser emitted by a mode-locked fiber laser device to temporal broadening via a time-frequency Fourier technique;
    splitting the mode-locked pulse laser after temporal broadening into a first transmitted laser beam and a second reflected laser beam;
    subjecting the first transmitted laser beam to spectrum broadening via a first grating pair arranged vertically to obtain a first broadband spectrum, and subjecting the second reflected laser beam to spectrum broadening via a second grating pair arranged horizontally to obtain a second broadband spectrum, the first broadband spectrum being orthogonal to the second broadband spectrum so as to provide a three-dimensional measurement space for a target object coated with a reflective film;

detecting, via a first photoelectric detector, a first signal light which comes from the first broadband spectrum and retraces in its original path after being reflected by the target object and finally is output by a first optical fiber coupler, and outputting a first high frequency electrical pulse signal from the first photoelectric detector to an oscilloscope;

detecting, via a second photoelectric detector, a second signal light which comes from the first broadband spectrum and passes through a third grating pair arranged vertically and a second optical fiber coupler, and outputting a second high frequency electrical pulse signal from the second photoelectric detector to the oscilloscope;

detecting, via a third photoelectric detector, a third signal light which comes from the second broadband spectrum and passes through a fourth grating pair arranged horizontally and a third optical fiber coupler, and outputting a third high frequency electrical pulse signal from the third photoelectric detector to the oscilloscope;

obtaining a measured period T' of a pulse sequence of the mode-locked pulse laser, and calculating a velocity component $v_y$ of the target object in a y-axis direction according to a formula of $v_y=(n(T-T')\times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere;

measuring a distance d between an intense depression of a start pulse and an intense depression of a last pulse in a pulse sequence of the second signal light, and calculating a velocity component $v_x$ of the target object in an x-axis direction in accordance with a formula of $v_x=d/((n-1)T)$;

measuring a distance d' between an intense depression of a start pulse and an intense depression of a last pulse in a pulse sequence of the third signal light, and calculating a velocity component $v_z$ of the target object in a z-axis direction in accordance with a formula of $v_z=d'/((n-1)T)$;

calculating a velocity v of the target object based on the velocity components $v_x$, $v_y$ and $v_z$ in accordance with a formula: $v=v_x \cdot i+v_y \cdot j+v_z \cdot k$, where i represents a unit vector in the x-axis direction, j represents a unit vector in the y-axis direction, and k represents a unit vector in the z-axis direction; and calculating an acceleration a, an angular velocity ω and an angular acceleration α based on the velocity v and a movement trajectory of the target object in accordance with the following formulas:

$a=\Delta v/\Delta t$, $\omega=d\theta/dt$, and $\alpha=\Delta\omega/\Delta t$.

2. The ultra-high speed time-frequency Fourier laser velocimetry method according to claim 1, wherein subjecting a mode-locked pulse laser to temporal broadening via a time-frequency Fourier technique comprises:
expanding the mode-locked pulse laser using a group delay dispersion element;

mapping a temporal spectrum of a laser pulse to a time waveform with an intensity envelope similar to the temporal spectrum through dispersive Fourier transform;

converting an optical signal into an analog electrical signal waveform through photoelectric detection, followed by performing digitization through real-time analog-to-digital conversion; and performing digital signal processing and data analysis, such that the mode-locked monopulse laser spectrum of the mode-locked fiber laser device is mapped to a time waveform directly displayed on the oscilloscope.

3. The ultra-high speed time-frequency Fourier laser velocimetry method according to claim 1, wherein each of the first grating pair, the second grating pair, the third grating pair and the fourth grating pair has a working wavelength of 1550 nm, a blazing angle of 28.41°, a line density of 600 lines/mm, and a diffraction efficiency of greater than 70%,
wherein the first transmitted laser beam enters the first grating pair at a Littrow angle, such that the first transmitted laser beam is split into the first broadband spectrum under diffraction effect of the first grating pair, and
the second reflected laser beam enters the second grating pair at a Littrow angle, such that the second reflected laser beam is split into the second broadband spectrum under diffraction effect of the second grating pair.

4. The ultra-high speed time-frequency Fourier laser velocimetry method according to claim 1, wherein a size of the target object detectable by the method depends on the three-dimensional measurement space defined by the first broadband spectrum and the second broadband spectrum.

5. The ultra-high speed time-frequency Fourier laser velocimetry method according to claim 4, wherein each of the first broadband spectrum and the second broadband spectrum has a width of 1 cm and a height of 0.2 cm after propagating 5 cm, such that the three-dimensional measurement space has a size of 1 cm×1 cm×0.2 cm.

6. The ultra-high speed time-frequency Fourier laser velocimetry method according to claim 1, wherein the velocity of the target object detectable by the method is determined by the repetition period of the mode-locked pulse laser and a width of each of the first broadband spectrum and the second broadband spectrum.

7. The ultra-high speed time-frequency Fourier laser velocimetry method according to claim 1, wherein the repetition period of the mode-locked pulse laser is 50 MHz, and the width of each of the first broadband spectrum and the second broadband spectrum is 1 cm, such that the velocity of the target object detectable by the method is 500 km/s.

8. An ultra-high speed time-frequency Fourier laser velocimetry system, comprising:
a mode-locked fiber laser device, configured to emit a mode-locked pulse laser;
a time-frequency Fourier system, configured to temporally broaden the mode-locked pulse laser;
a first optical fiber coupler, configured to collimate the mode-locked pulse laser coming from the time-frequency Fourier system;
a fiber circulator arranged between the time-frequency Fourier system and the first optical fiber coupler;
a beam splitter, configured to split the mode-locked pulse laser coming from the first optical fiber coupler into a first transmitted laser beam and a second reflected laser beam;

a first grating pair, arranged vertically and configured to split the first transmitted laser beam incident at a Littrow angle into a first broadband spectrum;

a second grating pair, arranged horizontally and configured to split the second reflected laser beam incident at a Littrow angle into a second broadband spectrum;

a first half-wave plate, arranged between the beam splitter and the first grating pair;

a second half-wave plate, arranged between the beam splitter and the second grating pair;

a third grating pair, arranged vertically and configured to reflect a second signal light coming from the first broadband spectrum;

a fourth grating pair, arranged horizontally and configured to reflect a third signal light coming from the second broadband spectrum;

a first photoelectric detector, configured to convert a first signal light coming from the first broadband spectrum and retracing in its original path into a first high frequency electrical pulse signal;

a second photoelectric detector, configured to convert the second signal light into a second high frequency electrical pulse signal;

a third photoelectric detector, configured to convert the third signal light into a third high frequency electrical pulse signal;

an oscilloscope, configured to receive and record the first high frequency electrical pulse signal, the second high frequency electrical pulse signal and the third high frequency electrical pulse signal;

a second optical fiber coupler, arranged between the third grating pair and the second photoelectric detector;

a third optical fiber coupler, arranged between the fourth grating pair and the third photoelectric detector;

a speculum, arranged between the third grating pair and the second optical fiber coupler, and configured to reflect the second signal light from the third grating pair; and a computing device, connected to the oscilloscope and configured to receive data from the oscilloscope, wherein the first broadband spectrum is orthogonal to the second broadband spectrum, the first grating pair and the second grating pair together provides a three-dimensional measurement space for a target object coated with a reflective film;

wherein when the target object moves within the three-dimensional measurement space, the first signal light is reflected by the target object and retraces its original path and finally output by the fiber circulator;

the oscilloscope is further configured to:

obtain a measured period T' of a pulse sequence of the mode-locked pulse laser;

measure a distance d between an intense depression of a start pulse and an intense depression of a last pulse in a pulse sequence of the second signal light; and measure a distance d' between an intense depression of a start pulse and an intense depression of a last pulse in a pulse sequence of the third signal light, and the computing device is further configured to:

calculate a velocity component $v_y$ of the target object in a y-axis direction according to a formula of $v_y=(n(T-T')\times c)/nT$, where n represents the number of pulses emitted in unit time, T represents a repetition period of the pulse sequence of the mode-locked pulse laser, nT represents time between a start pulse and a last pulse, nT' represents actual measured time, and c represents a velocity of laser in the atmosphere;

calculate a velocity component $v_x$ of the target object in an x-axis direction in accordance with a formula of $v_x=d/((n-1)T)$;

calculate a velocity component $v_z$ of the target object in a z-axis direction in accordance with a formula of $v_z=d'/((n-1)T)$;

calculate a velocity v of the target object based on the velocity components $v_x$, $v_y$ and $v_z$ in accordance with a formula: $v=v_x\cdot i+v_y\cdot j+v_z\cdot k$, where i represents a unit vector in the x-axis direction, j represents a unit vector in the y-axis direction, and k represents a unit vector in the z-axis direction; and calculate an acceleration a, an angular velocity ω and an angular acceleration α based on the velocity v and a movement trajectory of the target object in accordance with the following formulas:

$a=\Delta v/\Delta t$, $\omega=d\theta/dt$, and $\alpha=\Delta\omega/\Delta t$.

9. The ultra-high speed time-frequency Fourier laser velocimetry system according to claim 8, wherein each of the first grating pair, the second grating pair, the third grating pair and the fourth grating pair has a working wavelength of 1550 nm, a blazing angle of 28.41°, a line density of 600 lines/mm, and a diffraction efficiency of greater than 70%.

10. The ultra-high speed time-frequency Fourier laser velocimetry system according to claim 8, wherein a size of the target object detectable by the system depends on the three-dimensional measurement space defined by the first broadband spectrum and the second broadband spectrum.

11. The ultra-high speed time-frequency Fourier laser velocimetry system according to claim 8, wherein each of the first broadband spectrum and the second broadband spectrum has a width of 1 cm and a height of 0.2 cm after propagating 5 cm, such that the three-dimensional measurement space has a size of 1 cm×1 cm×0.2 cm.

12. The ultra-high speed time-frequency Fourier laser velocimetry system according to claim 8, wherein the velocity of the target object detectable by the system is determined by the repetition period of the mode-locked pulse laser and a width of each of the first broadband spectrum and the second broadband spectrum.

13. The ultra-high speed time-frequency Fourier laser velocimetry system according to claim 8, wherein the repetition period of the mode-locked pulse laser is 50 MHz, and the width of each of the first broadband spectrum and the second broadband spectrum is 1 cm, such that the velocity of the target object detectable by the method is 500 km/s.

14. A non-transitory computer-readable storage medium having stored therein instructions that, when executed by a processor of a mobile terminal, cause the ultra-high speed time-frequency Fourier laser velocimetry method according to claim 1 to be performed.

* * * * *